(12) United States Patent
Peters et al.

(10) Patent No.: US 8,610,031 B2
(45) Date of Patent: Dec. 17, 2013

(54) METHOD OF ARC WELDING ROOT PASS

(75) Inventors: Steven R. Peters, Huntsburg, OH (US); Frank M. Dragolich, Jr., Chardon, OH (US); David Barton, Twinsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 391 days.

(21) Appl. No.: 12/616,181

(22) Filed: Nov. 11, 2009

(65) Prior Publication Data

US 2011/0108527 A1 May 12, 2011

(51) Int. Cl.
*B23K 9/10* (2006.01)

(52) U.S. Cl.
USPC ............... 219/130.51; 219/130.1; 219/130.01

(58) Field of Classification Search
USPC .................. 219/130.01, 130.32, 130.51, 136, 219/137 PS, 137.2, 74
See application file for complete search history.

(56) References Cited

U.S. PATENT DOCUMENTS

| | | | |
|---|---|---|---|
| 4,110,590 A * | 8/1978 | Batey et al. ............. | 219/75 |
| 4,142,085 A | 2/1979 | Knipstrom et al. | |
| 4,246,463 A | 1/1981 | Shutt et al. | |
| 4,301,355 A | 11/1981 | Kimbrough et al. | |
| 4,302,656 A | 11/1981 | Poth et al. | |
| 4,314,132 A | 2/1982 | Porter | |
| 4,733,051 A | 3/1988 | Nadeau et al. | |
| 4,916,281 A | 4/1990 | Flasche et al. | |
| 5,155,330 A | 10/1992 | Fratiello et al. | |
| 5,202,546 A | 4/1993 | Nakayama et al. | |
| 5,777,343 A | 7/1998 | Rasel et al. | |
| 5,945,014 A * | 8/1999 | Crockett et al. ......... | 219/137 PS |
| 6,172,333 B1 * | 1/2001 | Stava ..................... | 219/137 PS |
| 6,410,876 B1 | 6/2002 | Rinaldi | |
| 6,441,334 B1 | 8/2002 | Aida et al. | |
| 6,518,545 B1 | 2/2003 | Richard et al. | |
| 7,115,324 B1 | 10/2006 | Stol et al. | |
| 2001/0007331 A1 | 7/2001 | Iwango et al. | |
| 2004/0074885 A1 | 4/2004 | Takatani et al. | |
| 2007/0017906 A1 | 1/2007 | Nowak et al. | |
| 2007/0175876 A1 | 8/2007 | Aberg | |
| 2007/0241087 A1 | 10/2007 | Peters | |
| 2009/0045172 A1 | 2/2009 | Van Erk | |

FOREIGN PATENT DOCUMENTS

| | | |
|---|---|---|
| EP | 005945 | 8/1981 |
| EP | 1136169 | 9/2001 |
| EP | 1136169 A1 * | 9/2001 |
| JP | 2003-94169 | 4/2003 |

OTHER PUBLICATIONS

Joseph et al., "Assessing the effects of GMAW-P parameters on arc power and weld heat input", www.aws.org/conferences/abstracts/2003/01b.pdf (2003).

International Search Report and Written Opinion from PCT/IB10/02880.

Response to Written Opinion from PCT/IB10/02880 dated Mar. 20, 2012.

* cited by examiner

*Primary Examiner* — Henry Yuen
*Assistant Examiner* — Ayub Maye
(74) *Attorney, Agent, or Firm* — Calfee, Halter & Griswold LLP

(57) ABSTRACT

A method for root pass welding steel plate and pipe is provided that uses pulse arc welding having a current pulse waveform exhibiting a low constant background current and fixed frequency. The welding process may be performed without a backer or backing material.

20 Claims, 2 Drawing Sheets

METHOD OF ARC WELDING ROOT PASS

SUMMARY OF THE DISCLOSURE

The present inventions relate to the art of welding root pass joints for steel plate and pipe. More particularly, the present inventions relate to welding root pass joints from one side.

BACKGROUND OF THE DISCLOSURE

One side arc welding has been practiced for many years. Examples of such technology is disclosed in Crockett et al. U.S. Pat. No. 5,945,014, Shutt U.S. Pat. No. 4,246,463 and Fratiello U.S. Pat. No. 5,155,330, all of which are fully incorporated herein by reference as background to the present invention.

When welding butt joints, it is often advantageous to perform the arc welding process from a single side with the plates generally horizontal so the electrode used to deposit metal can move along the flat heavy plates at the joint between the edges of the plate to perform the joining operation. This type of welding is used, for example, to weld large oil rigs which require large segments of steel plates to be joined together for constructing the pontoon area of the oil rigs. Pulse arc welding is also used in shipbuilding for ship and submarine hulls and deck plate to weld thick heavy plate with out of position welding, such as fillet welds, T-joints, square butt joints, lap joints and groove welds. The thick heavy plates used on ship hulls eliminates concerns about blow through and there is less concern in those applications for the quality of the back bead as further finishing welds or processes are performed due to the criticality of such welds.

Plates and pipe are also commonly welded using a technique known in the art as root pass welding. Root pass welding may be a single side type of welding operation for joining two heavy steel plates having their edges butted together, or for welding pipe joints. The butt joint used for root pass welding may be formed as a single-V preparation joint in which the facing edges of the workpieces have a tapered edge to define a channel. Below this channel is a backing material such as a copper block, for example, having a recessed cavity. This recessed cavity is filled with a granular flux to help form the back side of the weld bead as the root pass or first layer of molten metal is applied along the bottom portion of the channel between the edges of the heavy steel plates. Other mediums, such as fiber tape and ceramic tile, may also be used to form the backside of the weld bead.

The single-V preparation joint is typically characterized by each facing edge being formed as a knife edge, or alternatively a tapered edge with a land. The facing edges that are to be joined may abut each other, referred to as zero gap, or may have a prescribed gap therebetween. Root pass welding is commonly done with short arc welding so as to prevent blow through and overheating at the weld joint. Short arc welding is also commonly used on root pass joints because there is less drooping and suck back. Short arc welding is also typically used on thinner work pieces because of less penetration with a smaller puddle and lower heat input. Short arc welding typically is also a slow process.

The Crockett et al. patent noted above provides a very useful technique for performing root pass welding on steel plate. The process uses pulse arc welding with a backing material, and may use variable frequency pulses to control heat.

SUMMARY OF THE DISCLOSURE

The present inventions are directed to the use of pulse arc welding of root pass joints from one side of the joint, using a narrow, controlled focused arc having a low constant background current and a fixed current pulse frequency. The process produces a small smooth bead on the back side and can be performed substantially faster compared to conventional short arc processes that are typically used for root pass welding. In an exemplary embodiment, a method for pulse arc welding the root pass of a butt weld joint may include tapering the facing edges to form an included angle in the range of about 30-80 degrees, positioning the facing edges in close proximity to each other to define a channel, moving an electrode within the channel, applying current that passes between the electrode and the facing edges to form a complete root pass between the facing edges from a single side of the joint, with the current having a waveform with a low constant background current level and fixed frequency current pulses.

In an alternative embodiment, pulse arc welding of root pass joints may also be performed without the use of a backer or backing material. This facilitates welding root pass joints of not only plate and pipe, but particularly for example, square pipe. In an exemplary embodiment, a method for pulse arc welding the root pass of a butt weld joint includes tapering the facing edges to form an included angle in the range of about 30-80 degrees, positioning the facing edges in close proximity to each other to define a channel, moving an electrode within the channel. applying current that passes between the electrode and the facing edges to form a complete root pass between the facing edges from a single side of the joint, the root pass weld being formed exclusively between the facing edges without a backer, the current having a waveform with a constant background current level and fixed frequency current pulses.

To fill the channel after the root pass has been laid, the methods of the present inventions may optionally include the concept of providing a filling process such as, for example, with a submerged arc welding fill process, GMAW fill welding process or flux core fill welding process. The submerged arc welding process welding process may alternatively be coordinated with, and performed behind in a delayed fashion, the root pass arc welding process.

In the exemplary embodiments and various alternative embodiments, a root pass weld may be performed with a single, small diameter electrode, and with pulse welding without blow through, with good penetration and a small smooth back side weld bead without needing additional post weld processes. The pulse welding may be substantially faster than the known short arc welding of root pass joints, and may optionally be performed without a backer, or backing material.

These and other inventive aspects and advantages of the present inventions will be readily apparent to those skilled in the art from the following description read in view of the accompanying drawings.

DESCRIPTION OF THE EXEMPLARY EMBODIMENTS

Figure 1:
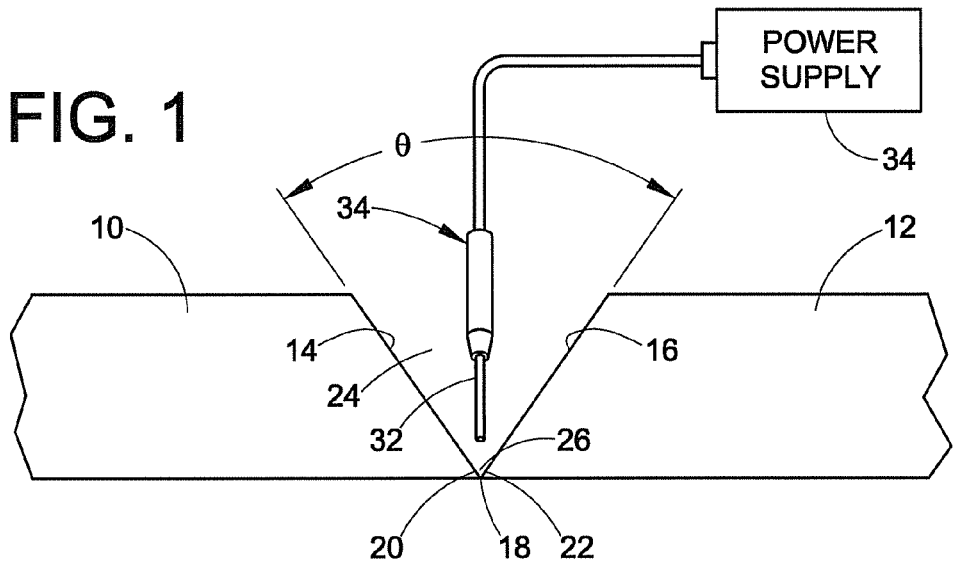
FIG. 1 is a schematic illustration of a root pass form that may be used with the present inventions.

FIG. 1 illustrates two steel plates 10, 12 with a thickness preferably of about ¼ inch or greater. However, the welding processes herein may also be used with thinner wall material down to about ⅛", including for pipe as well as plate. The plates 10, 12 are to be joined along adjacent edges 14, 16, which edges are cut at an included taper angle θ to define lower knife edges 20, 22 which may optionally be spaced from each other by a gap distance 18. In the exemplary embodiment, the gap distance 18 is zero, meaning that the knife edges 20, 22 touch, but as an alternative a gap 18 may be provided between the knife edges, for example, about a 2 mm gap, with preferably a gap in the range of about 1.6 mm or less. However, larger gaps may be accommodated depending on overall welding parameters.

Welding is performed preferably although not necessarily in a generally horizontal flat or nearly flat position, for plate or for rotated pipe, though other positions may be used as needed. One sided root pass welding as taught herein is advantageous for pipe where internal access to the weld site may be limited. The methods and processes described herein are not limited to any particular material or alloy, although the exemplary embodiments are described herein with respect to exemplary materials.

The included angle θ may be in the range of about 30 degrees to about 80 degrees, with the angle θ typically being greater as the plate thickness decreases. For a thickness less than or equal to ½ inch, the included angle θ may be approximately 60 degrees. For greater thicknesses, the included angle may be about 45 degrees, for example. Typically, as the included angle decreases, a gap is used to assure good penetration into the side walls. The edges 14, 16 of the plates 10, 12 thereby define a channel 24 having a lower area, or root pass area 26, defined down near the adjacent knife edges 20, 22. Although not shown in the drawings, the facing edges 14, 16 may further include lands down at the root pass area 26, as is generally known for root pass welding. It will further be noted that the exemplary embodiments herein allow for root pass welding without the use of a backer or backing material.

Figure 1A:
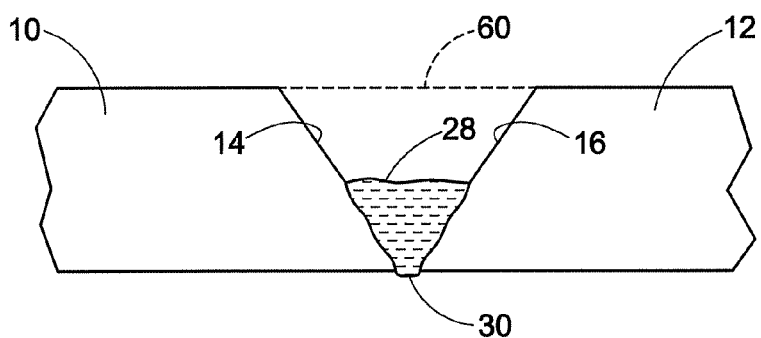
FIG. 1A illustrates a stylized view of a post-weld root pass joint using one or more of the present inventions.

By positioning the plates 10, 12 as shown in FIG. 1 for example, the plates are prepared to receive the root pass, which pass is a solidified metal portion 28 between the edges 14, 16 down in the root pass area 26. FIG. 1A illustrates a typical root pass weld 28 achieved with the present inventions. Note that the weld has good penetration into the facing edges 14, 16 and exhibits a nice small rounded bead 30 on the back side of the weld 28. This small smooth bead 30 is particularly beneficial for pipe. Furthermore, there is no undercut on the back bead and there is good positive reinforcement which is good for heavy plate applications.

During the welding process, the metals of the electrode 32 and the lower knife edge portions in the root pass area 26 are melted to form the composite integral solidified steel mass or root pass weld 28. In accordance with an exemplary embodiment, the root pass weld 28 is produced by using a single electrode 32, wherein an arc welding torch 34 of conventional design is moved along the channel 24 in the root pass area 26. In one exemplary process, the electrode 32 may be oriented at a near vertical position relative to the edges 14, 16 (in other words, generally bisecting the included angle θ (as shown in FIG. 1, for example) although a suitable push or drag angle (which would be into or out of the plane of the FIG. 1 drawing respectively) may also be used as needed. A suitable welding torch 34 may be model Magnum™ 400 with a Power Feed™ 25M, both available from The Lincoln Electric Co., Cleveland, Ohio. Other welding systems may alternatively be used.

The electrode 32 is fed out from the torch 34 along with a shielding gas which is typically a mixture of Argon and $CO_2$ to shield the electric arc. As this is a pulse arc process, the arc melts the facing edges in the root pass area 26, and the arc also melts the electrode 32 which is melted into discrete drops. The drops are driven down the arc into the puddle formed by the melting facing edges for depositing a molten metal from the electrode to create the root pass weld 28.

The electrode 32 receives voltage and current from a power supply 36. The GMAW-pulse arc welding methods of the exemplary embodiments of the present inventions involve the use of a welding operation which may be performed using any commercial power supply 34, such as, for example, a POWER WAVE® 455M sold by The Lincoln Electric Company of Cleveland, Ohio. A power supply of the type used with the present inventions creates a series of current waveforms, each of which is comprised of a multitude of closely spaced current segments having an accurately controlled magnitude. By adjusting the magnitude and duration of the various adjacent segments, a waveform of the desired shape can be created. The pulsed current waveform may be produced using an inverter type power supply such as the POWER WAVE® 455M. Of course, a waveform of the type useful with the present inventions may alternatively be produced by a down chopper or other switching type power supplies or even dual transformers, to name a few examples. The welding processes herein may achieve arc lengths, as measured in arc voltage, in the range of about 17 volts to about 27 volts, with a more preferred range of about 20 volts to about 22 volts.

Figure 2:
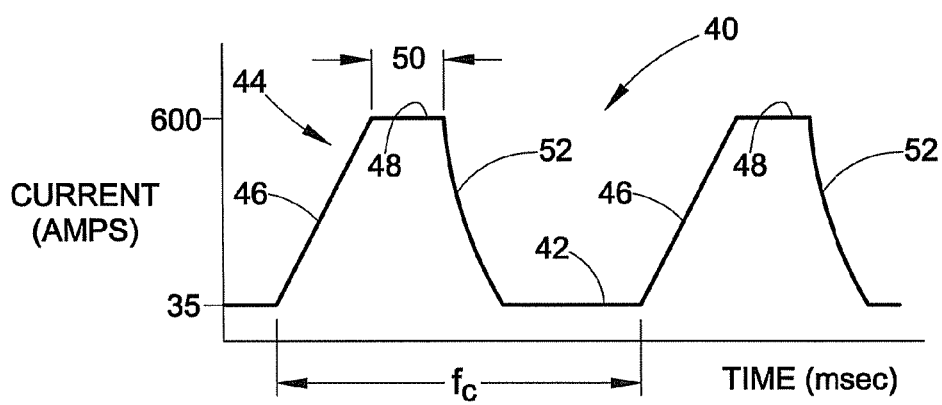
FIG. 2 is an exemplary current waveform, not to scale on the vertical axis, that may be used with the present inventions.

With reference to FIG. 2, we illustrate an exemplary although somewhat stylized current pulse waveform 40 that may be used with the present inventions. This waveform 40 is illustrated in a stylized manner for clarity and ease of explanation, it being readily understood by those skilled in the art that the actual current pulses will not necessarily exhibit such smooth edges and transitions, but will nonetheless exhibit the basic characteristics described herein. The basic characteristics of this waveform 40 is that it produces a tight, stable and focused arc to allow a pulse arc welding process to be used for root pass welding, optionally without a backer. By "tight, stable and focused" arc is meant a welding arc that stays generally narrow and well defined in the root pass area 26 without excessive wandering over to the edges 14, 16 out of the root pass area 26. This is believed to be the first use of low constant background current and fixed frequency current pulse arc welding for root pass welds, particularly without the use of a backer. Typically, pulse arc welding is used for thick heavy plate welding and out of position welding, such as for fillet welds, T-joints, groove welds and so on but not for root pass because of the perceived likelihood of blow out due to the thin nature of the root pass, as well as a perceived likelihood that a good backside bead would not form. Pulse arc welding therefore was used for root pass but only with a backing material.

The exemplary waveform 40 includes the feature of a low and stable background current 42, meaning that the background current is generally constant and preferably does not appreciably wander which could be detrimental to the root pass weld. The background current may be any suitable low value, preferably just enough to maintain the arc from being extinguished. We have found that a suitable range for the background current 42 is about 14 amps to about 40 amps, however even smaller levels such as down to about 5 amps or less may be used if the overall welding system can keep the arc lit. The second feature of note is that the waveform 40 has a fixed frequency during the welding operations. We have found that a suitable range for the fixed frequency current pulses is about 60 hertz to about 300 hertz, but the actual frequency used in practice may be selected as needed for a particular system design and welding parameters. The combination of a fixed frequency pulse waveform and a low constant background current produce a tight, stable and focused arc that unexpectedly permits pulse arc welding for excellent one side root pass welds. Thus, although the waveform of the current pulse has been used before in welding thick plate butt joints such as noted hereinabove, the state of the art would not have expected or tried to use such pulse arc welding on tightly fitted root pass butt joints due to the expected occurrence of blow through and excessive heating, along with producing poor beads. Pulse arc welding also does not typically produce a stable and tightly focused arc such as provided in the present disclosure.

Each current pulse 44 may be characterized by an electrode positive pulse having a first transition 46 or front flank from the background level 42 to a peak level 48. The peak level 48 is held for a time duration or peak dwell time 50 to assure adequate heat is applied to allow the weld to achieve good penetration of the facing edges in the root pass area 26. A rear flank or second transition 52 is produced as an exponential decrease back to the background level 42.

Figure 2A:
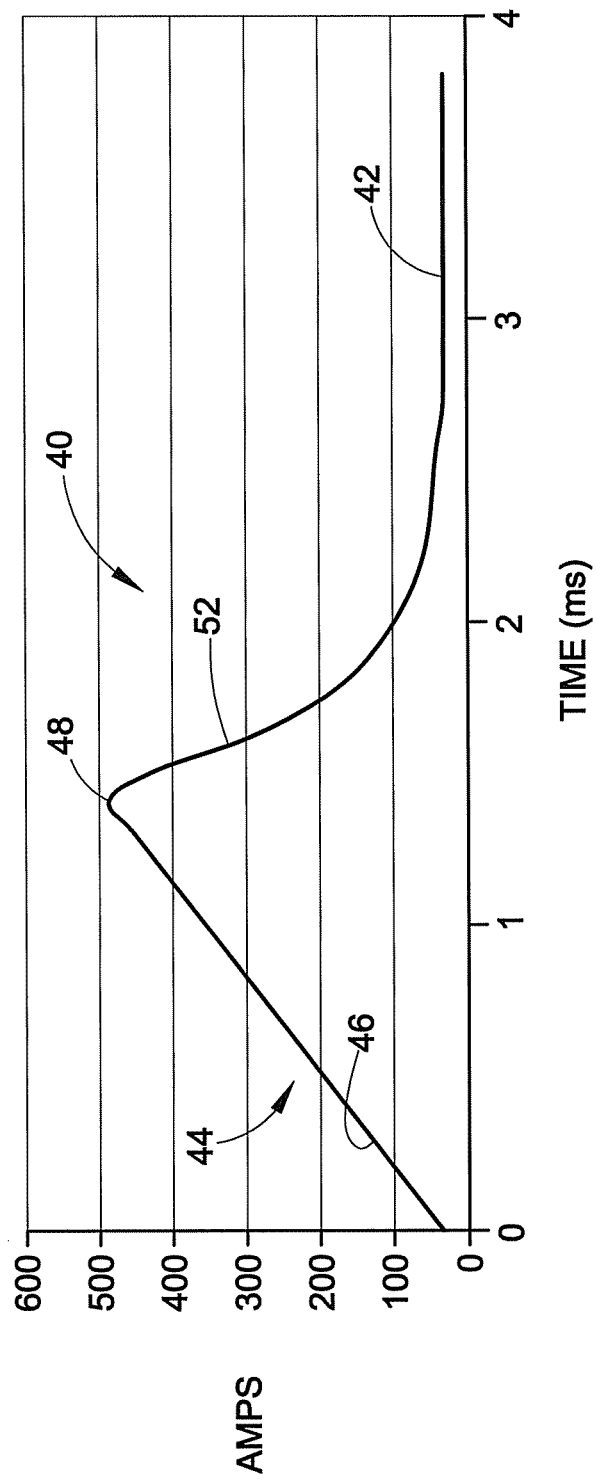
FIG. 2A is an exemplary wave form model for a 0.045 electrode at about 250 inches per minute feed rate, to show current and time scales.

With reference to FIG. 2A we show another current pulse model for a 0.045" electrode at a wire feed speed of about 250 inches per minute. In this example, the first transition 46 may have a ramp of about 325 amps/millisecond; the ramp up time may be about 1.4 milliseconds; the peak current about 430 amps with a peak time of about 1.5 milliseconds, a tailout time 52 of about 2.6 milliseconds to a tailout target and background current of about 35 amps. In this example, the period may be about 3.8 milliseconds. These values are exemplary in nature, it being understood by those skilled in the art that for each welding process these values may be changed as needed.

In comparing FIGS. 2 and 2A it will be noted that the designer may adjust the various portions of the waveform pulse 40, including one or more of the ramp up rate, the peak current level, the peak dwell time, and the tailout time and ramp down rate; as well as the tailout target and background current levels.

In some applications it may be suitable simply to use the same waveform 44 for each pulse, with the use of constant background current and fixed frequency. The peak amplitude 48 and the peak amplitude duration 50 may be adjusted based on a feedback loop that is used to hold a constant arc length, as is known. Frequency may be determined from the inverse of the time period from front flank 46 to the next succeeding front flank 46 as denoted by the period $f_c$, for example, or any other portion of the waveform as it repeats. We have found that a fixed frequency in the range of about 60 Hz to about 300 Hz may be used. However, we have further found better control of the root pass welding process is achieved by also controlling or adjusting the transition speed ramp rate of the front flank 46 and controlling or adjusting the exponential speed of the rear flank 52. These added control features, along with controlling the peak amplitude 48 and duration 50 of the peak amplitude, provide excellent control of the welding arc to produce a stable and steady arc as a result of the use of a fixed frequency and a very focused arc due to the use of a low constant background current 42. The exemplary power supply 34 in the form of the POWER WAVE® 455M, may conveniently be used to execute these control features when setup following the manufacturer's instructions.

The electrode 32 is fed from the torch 34 to maintain a desired rate of metal deposit as is known. The power supply 34 produces a desired average DC voltage on the electrode, for example, in the range of about 16 VDC to about 25 VDC, with a preferred range of about 18 VDC to about 21 VDC, and controls the current (after the arc is struck) that passes through the electrode 32 to the plates 10, 12 to have a waveform as exemplified in FIG. 2, for example, and otherwise described herein. Typically, the plates 10, 12 are electrically negative or grounded and we use a positive transition current pulse (i.e. electrode positive). The current flow melts the electrode wire extending from torch 50 into drops that are driven individually down the arc into the molten puddle to form after cooling the root pass weld 28. This welding process may also use smaller diameter electrode wire, for example in the range of about 0.02 inch to about 0.07 inch, more preferably in the range of about 0.035 inch to about 0.052 inch, or about 0.9 mm to about 1.4 mm.

We have found a number of welding parameters that are well suited for this GMAW-Pulse welding of the root pass. Typical wire feed speeds may be in the range of about 200 inches per minute to about 600 inches per minute. The wire feed speed will be adjusted, as is known, based on such factors as wire size (larger wires typically requiring slower feed speeds) and whether the welding is being performed manually (semi-automatically) or automatically. The travel speed of the electrode 32 along the channel 24 may be in the range of about 5 inches per minute to about 25 inches per minute with about 19 inches per minute to about 21 inches per minute being typical for automatic welding. We have found that the pulse arc welding process may be performed with shorter stick out distances, such as about ½ inch to about ⅞ inch, or preferably about 15 mm to about 19 mm. However, some root pass joints may be fairly deep due to thicker workpieces at the 60 degree included angle, so stick out distances may more preferably be in the range of about ⅜ inch to about 1½ inches. Fit-up parameters may be in the range of up to about ⅛ inch gap between the facing edges 14, 16, more preferably in the range of about 0 to about 1.6 mm gap between the facing edges 14, 16, and the edges may have lands instead of knife edges, in a range up to about 1.6 mm. Preferred fit-up is a 0 mm land and 0 mm gap. In some weld joints, oscillation may be optionally used as needed, for example, when the gap 18 (FIG. 1) exceeds about 0.6 mm.

It will be readily apparent to those skilled in the art that the wire feed speeds and electrode travel speeds are significantly faster than the deposition rates using short arc welding processes that are the norm for root pass welding. For example, typical wire feed speeds for short arc welding with a 0.045 electrode wire are about 200 inches per minute, and with a 0.035 wire about 325 inches per minute. In contrast, with the present invention wire feed speeds may be about 460 inches per minute up to at least 600 inches per minute.

To fill the remainder of channel 24 above the root pass weld 28 (as indicated by the dashed line 60 in FIG. 1A, optional implementation of available fill welding processes may be used, including but not limited to a submerged arc welding process, a GMAW fill welding process, or a flux core fill welding process, to name a few examples. The submerged arc welding process may in practice be performed at about the same time as the root pass welding process, albeit somewhat time delayed by having the submerged arc welding electrode moving in unison at a sufficient spacing so that the submerged arc process does not interfere with the critical root pass process.

The welding processes herein may be used with many different types of material, including but not limited to heavy steel plate, alloy materials such as stainless steel and Nickel based alloys. Furthermore, although the exemplary embodiments illustrate welding for ¼" thick plate or pipe, the processes may be used for thicknesses as low as ⅛". Still further, while the various exemplary processes use an included angle θ of about 30 degrees to about 80 degrees, the processes may also be used with smaller bevel angles of about 3 degrees to about 30 degrees, for example but not limited to, U-grooves having a large bevel angle that tapers to a smaller bevel angle at the root pass area.

The following examples are provided as exemplary implementations of the present inventions:

EXAMPLE 1

Plate Material: A36 plate
Thickness: ¼ inch
Joint: 60 degree included angle
Land=0
Gap=0
No backer
Electrode 0.045 inch (1.2 mm) Super Arc™ L-56 Vertical orientation
Polarity: Positive pulse
Voltage: 21 Volts
Shielding Gas: 90% Argon 10% $CO_2$
Wire Feed Speed: 300 inches/minute (7.62 meter/minute)
Power Source: POWER WAVE® 455M
Current: 180-200 amps
Stick out distance: ½ inch (12.7 mm)
Travel speed: 11-15 inches/minute
Torch angle: 15 degree Push
No Oscillation

EXAMPLE 2

Pipe Joint Material: X65 pipe (24 inch pipe)
Thickness: ½"
Joint: 60 degree included angle
Land=1.6 mm
Gap=1.6 mm
No backer
Electrode 0.052 inch Super Arc™ L-56
Polarity: Positive pulse
Voltage: 21.5 Volts
Shielding Gas: 85% Argon 15% $CO_2$
Wire Feed Speed: 220 inches/minute
Power Source: POWER WAVE® 455M
Current: 202-235 amps
Stick out distance: 15 mm
Travel speed: 20 inches/minute
Torch angle: 0 to 10 degree Drag
Oscillation Frequency: 4 Hz/amplitude 1.5 mm/0.04 L/R dwell

EXAMPLE 3

Thickness: ⅜ inch plate
No backer
Electrode 0.045 inch Super Arc™ L-59
Polarity: Positive pulse
Voltage: 21 Volts
Shielding Gas: 85% Argon 15% $CO_2$
Wire Feed Speed: 460 inches/minute
Power Source: POWER WAVE® 455M
Current: 340 amps
Stick out distance: 1.5 inches
Travel speed: 40 inches/minute
Torch angle: 0 degree
Oscillation Frequency: Off These examples are not intended to be limiting as to the scope of the present inventions, but rather are exemplary embodiments of welding process parameters that may be used.

We claim:

1. A method for pulse arc welding a root pass of a butt weld joint, comprising:
providing first and second joint members with first and second facing edges tapered to form an included angle;
positioning the first and second facing edges to define a channel;
moving only a single electrode within the channel;
applying current that passes between the single electrode and the first and second facing edges to form a complete root pass between the first and second facing edges from a single side of the first and second joint members, the root pass forming a weld bead along a bottom surface opposite the first and second facing edges, and being formed exclusively by the single electrode and between the first and second facing edges without a weld bead supporting medium;
said current having a waveform comprising a constant background current level and fixed frequency current pulses, wherein a stable background current level is about 5 amps to about 40 amps, and the waveform is configured to produce a stable focused arc that penetrates a root pass area of the first and second facing edges.

2. The method of claim 1 wherein the joint comprises a plate or pipe joint and is formed between edges that are in the range of about one-eighth inch thick to about two inches thick or greater.

3. The method of claim 1 wherein each of the first and second facing edges is tapered to a knife edge.

4. The method of claim 1 wherein the root pass is welded using a GMAW-Pulse process in a generally horizontal position.

5. The method of claim 1 wherein the single electrode has a diameter in the range of about 0.02 inch to about 0.07 inch.

6. The method of claim 1 comprising the step of performing a fill welding process after the root pass weld is formed wherein the fill welding process is performed using a submerged arc welding process, GMAW fill welding process or flux core fill welding process.

7. The method of claim 6 wherein said fill welding process is performed during but delayed from the root pass welding process.

8. The method of claim 1 wherein each of the first and second facing edges comprises a land.

9. The method of claim 1 wherein front ends of the first and second facing edges are separated by a gap of up to about ⅛ inch prior to welding.

10. The method of claim 1 wherein the first and second facing edges are in contact with each other prior to welding.

11. The method of claim 1 wherein the frequency of the fixed frequency-current pulses is in the range of about 60 Hz to about 300 Hz.

12. The method of claim 1 wherein the first and second facing edges are tapered to an included angle of about 3 degrees to about 80 degrees.

13. The method of claim 1 wherein the welding process is performed with moving the electrode at a travel speed in the general range of about 5 inches per minute to about 25 inches per minute.

14. The method of claim 1 wherein the welding process is performed with a wire feed speed in the general range of about 300 inches per minute to about 600 inches per minute for a 0.045 inch electrode wire.

15. The method of claim 1 wherein the electrode is oriented at a push angle of about 0 degrees to about 40 degrees.

16. The method of claim 1 wherein the welding process is performed at a stick out distance of about 3/8 inch to about 1 1/2 inches.

17. The method of claim 1 wherein said current comprises an average value DC voltage in the range of about 16 volts DC to about 25 volts DC.

18. A method for pulse arc welding a root pass of a butt weld joint, comprising:
   providing first and second joint members with first and second facing edges tapered to form an included angle;
   positioning the first and second facing edges to define a channel;
   moving only a single electrode within the channel;
   applying current that passes between the single electrode and the first and second facing edges to form a complete root pass between the first and second facing edges from a single side of the first and second joint members, the root pass forming a weld bead along a bottom surface opposite the first and second facing edges, and being formed exclusively by the single electrode and between the first and second facing edges without a weld bead supporting medium;
   said current having a waveform comprising a constant background current level and fixed frequency current pulses, wherein said waveform is configured to produce an arc voltage within a range of about 16 VDC to about 25 VDC, to produce a stable focused arc that penetrates a root pass area of the first and second facing edges.

19. The method of claim 18 wherein the root pass is welded using a GMAW-Pulse process in a generally horizontal position.

20. The method of claim 18 wherein the welding process is performed with moving the electrode at a travel speed in the general range of about 5 inches per minute to about 25 inches per minute.

* * * * *